United States Patent Office

Re. 27,490
Reissued Sept. 26, 1972

27,490
ELECTROSTATIC PRINTING

Harold G. Greig, Princeton, N.J., assignor to RCA Corporation

No Drawing. Original No. 3,053,688, dated Sept. 11, 1962, Ser. No. 805,740, Apr. 13, 1959. Application for reissue June 18, 1963, Ser. No. 289,463
Int. Cl. B44d *1/02;* G03g *9/00*
U.S. Cl. 117—37 LE 18 Claims

Matter enclosed in heavy brackets [ ] appears in the original patent but forms no part of this reissue specification; matter printed in italics indicates the additions made by reissue.

ABSTRACT OF THE DISCLOSURE

*An improved liquid developer for a xerographic image consisting essentially of finely divided pigment particles, an organic dielectric material capable of forming a resinous coating, coating said pigment particles and insuring that the particles have a charge of substantially uniform polarity and magnitude, and a carrier liquid, for example, dimethyl polysiloxane, for said pigment particles in which said material is insoluble. The improved liquid developer is used in developing an electrostatic image on an insulating surface by applying said developer to said surface, depositing the developer particles on said surface by electrostatic attraction thereto, and heating said surface to fuse said particles thereto and remove the carrier liquid.*

This invention relates generally to electrostatic printing. More particularly, it relates to improved materials and methods for developing electrostatic images.

In the art of electrostatic printing, electrostatic images are produced on the surface of an insulating material. Such images comprise a pattern of electrostatic charges on the surface. Visible images are commonly produced therefrom by cascading across the surface a dry mixture of finely-divided developer particles and substantially larger carrier particles. When the developer particles are triboelectrically-charged in the opposite polarity to the electrostatic charges, they deposit in charged areas to produce a visible image in substantial configuration with the pattern of charges. When the developer particles have the same polarity as the electrostatic charges a visible image is produced in reverse configuration with respect to the pattern of charges.

The foregoing method of developing electrostatic images is described in "Electrofax" Direct Electrophotographic Printing on Paper, by C. J. Young and H. G. Greig, RCA Review, December 1954, vol. XV, No. 4. Also described in that publication are other methods of development such as: powder cloud, liquid mist and magnetic brush types.

The recording element may comprise almost any insulating surface but, preferably, the recording surface is also photoconductive to enable the recording of light images. Recording elements comprising photoconductive selenium coated plates are described in U.S. Patent 2,297,691, issued October 6, 1942 to C. F. Carlson. Recording elements comprising photoconductive coatings on paper are described in the Young and Greig publication, op. cit.

Recently, a so-called liquid process for developing electrostaic images has been proposed in which the solid developer particles are suspended in an insulating carrier liquid. Liquid development methods provide many distinct advantages over the use of dry developer mixtures and other methods of developing electrostatic images, for some applications. Basically, the liquid developer previously described consists of finely-divided developer particles dispersed in a hydrocarbon liquid. This developer can be flowed over a surface bearing an electrostatic image, or the surface can be immersed in a tray of liquid developer. It can also be sprayed or rolled on to the surface. When appropriate developer particles are dispersed in a properly selected liquid, they acquire an electrophoretic or triboelectric charge enabling them to be attracted to an electrostatic charge pattern of appropriate polarity. Deposition of the developer particles on the charge image is an example of the phenomenon known as electrophoresis or cataphoresis. A liquid developer process for charge images is described in greater detail by K. A. Metcalf and R. J. Wright in a paper entitled "Xerography," published in the Journal of the Oil and Colour Chemists' Association, November 1956, volume 39, No. 11, London, England and in another paper entitled "Liquid Developers for Xerography" published in the Journal of Scientific Instruments, February 1955, vol. 32.

Although the above-mentioned liquid developer compositions are suitable for many purposes, they do possess undesirable properties. Most hydrocarbon liquids are solvents for developer partices which include resins and waxes or organic pigments. When resinous particles are dispersed in such a liquid, they dissolve at least to some extent so that they become tacky and tend to agglomerate. Thus, such dispersions must be freshly made a short time prior to use. If the dispersions stand for any extended period of time, the developer particles will ball up or cake. The tackiness of the developer particles caused by the hydrocarbon liquid can also make them adhere in unwanted image areas which they may contact during development. Unless some fixative spray is applied to an image developed with such a dispersion, the tacky developer particles will tend to smear during handling. To improve the quality of the developed image and to accelerate drying of the surface on which the image rests, it is frequently desirable to heat that surface to drive off the liquid and diffuse the developed image into the base material. When hydrocarbon carrier liquids are employed, such a practice would be extremely dangerous in view of the fire hazard involved. Also, whether heated or not, most hydrocarbon liquids have a very objectionable odor and the vapors thereof are toxic. Thus, the use of such liquids calls for employing expensive auxiliary equipment such as exhaust hoods in order to remove fumes. For the above reason it can be readily seen that such liquids are unsuitable for many applications such as, for example, office copiers.

Accordingly, it is a general object of this invention to provide improved liquid developer mixes for electrostatic printing.

It is a further object of this invention to provide an improved liquid developer composition which may, without danger of fire, be heated on a surface to fuse thermoplastic particles contained in the liquid, to the surface.

It is a further object of this invention to provide improved liquid developer compositions which are relatively odorless and non-toxic.

The foregoing objects and other advantages are accomplished in accordance with this invention which provides improved liquid compositions for developing electrostatic images. The compositions comprise dispersions of finely-divided developer particles in a liquid consisting essentially of a dimethyl polysiloxane, the developer particles being insoluble in the liquid. Also contemplated is the development of electrostatic images by applying thereto such a liquid dispersion wherein thermoplastic developer particles are employed. Subsequent to development, the developed image is heated to remove liquid on the surface on which it rests and to fuse thereon the developed image.

Specific examples and additional advantags of the iquid developers and of the improved methods of deeloping electrostatic images in accordance wtih this inention are included in the detailed description which ollows:

Dimethyl Polysiloxanes

An important feature of this invention is the provision f a carrier liquid consisting essentially of at least one limethyl polysiloxane. Such compounds have a structural ormula:

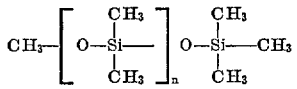

where n may vary from 0 to 2000 and even higher. The igher the value of n, the higher the viscosity of the liquid t a given temperature. At room temperature, viscosity nay vary from as low as 0.65 centistoke to as high as ,000,000 centistokes, but for the purpose of the present nvention, it is preferred to use only those members of he family or mixtures thereof having a viscosity up to bout 3 centistokes at room temperature.

It has now been found that these liquids are extremely seful for electrostatic printing for the following reasons. The liquids are very poor solvents for organic plastics. The members of this family of compounds have relatively igh flash points. For example, a dimethyl polysiloxane aving a viscosity of 2 centistokes, has a flash point of .75° F. and one of 3 centistokes a flash point of 215° F. This compares with toluene at 40° F., turpentine at 90° F. and high-flash naphtha at 112° F. The dimethyl polyiloxanes are practically odorless and non-toxic making hem feasible for use in office copiers. The insulating rganic liquids such as benzene, toluene, turpentine, etroleum fractions, carbon tetrachloride, cyclohexane, tc. which have previously been described as being suitble for electrophoretic development in electrophoography, are all deficient with respect to one or more f the properties mentioned above. The dimethyl polyiloxanes are also extremely hydrophobic and have exellent dielectric properties. This is of particular advanage in the present invention since most organic liquids ose their insulating properties in atmospheres of high elative humidity, whereupon they become too conducive for effective operation.

Developer Mixes

To prepare a suitable developer composition, finelylivided particles of an electroscopic developer material, re dispersed in dimethyl polysiloxane in a proportion of 0 parts by weight of developer material to 80 parts by veight of a dimethyl polysiloxane having a viscosity of bout 0.6 to about 3 centistokes. The ratio of developer naterial to liquid in this example is generally too high or most applications. However, this ratio is a convenent one for preparing a composition which is to be tored for an extended period or which is to be provided o the ultimate user. Prior to use, the mixture is diluted vith additional dimethyl polysiloxane to provide a conentration of developer material in the composition of bout 0.2% to about 6% by weight. An important proprty of dimethyl polysiloxane evidences itself when deeloper compositions are stored for extended periods. Developer particles comprising thermoplastic materials, xamples of which are provided hereinafter, may be disersed in such liquids and stored practically indefinitely vithout agglomerating.

A specific example of a suitable toner or developer naterial to be dispersed in the dimethyl polysiloxane omprises the following:

EXAMPLE I 00 parts by weight of Piccolastic Resin 4358A (an elastic thermoplastic resin composed of polymers of styrene, substituted styrene and its homologs of the Pennsylvania Industrial Chemical Corp., Clairton, Pennsylvania)

12 parts by weight Carbon Black 12 parts by weight Nigrosine SSB—Color Index No. 50415

8 parts by weight Iosol Black—Color Index Solvent Black 13

This developer material is prepared by melting the resin and mixing in the other materials. When a uniform mix is obtained, it is cooled, ground to a fine powder and classified to obtain a desired particle size. A convenient particle size is one obtained by screening through a 200 mesh which provides a maximum particle diameter of about 74 microns. This developer material may be dispersed in liquid by any of the commonly known techniques.

EXAMPLE II

A low-melting point (120° C.) developer material suitable for dispersion in a dimethyl polysiloxane may be comprised as follows:

60 parts by weight Piccolastic D 100
40 parts by weight Piccolastic C 125
9 parts by weight Carbon Black These materials are mixed together in powder form, then melted and mixed again to obtain a homogeneous dispersion. The melt is then cooled, ground and classified to obtain the desired particle size. It has been found that even with a low-melting toner of this character, which has a tendency to cake with storage, a stable noncaking dispersion is obtained in a dimethyl polysiloxane having a viscosity of about 2 centistokes.

In the foregoing examples many organic resins and waxes may be substituted for those described. Some of these are the following:

Acrawax C (a synthetic wax—octadecenamide) The Glycol Products Co., Brooklyn, N.Y.—melting point between 133 and 140° C.

Carnuba Wax—melting point about 80° C.

Polymekon Wax (a commercially modified microcrystalline wax of the Warwick Wax Co., N.Y.)—melting point about 93 to 127° C.

Ultracera Amber Wax—a microcrystalline petroleum wax of the Bareco Wax Co., Barnsdall, Oklahoma—melting point between about 108 and 112° C.

Be Square Wax White—a microcrystalline petroleum wax of the Bareco Wax Co., Barnsdall, Oklahoma—melting point betwen about 105 and 109° C.

Petronauba D Wax—a microcrystalline petroleum wax of the Bareco Wax Co.—melting point about 103° C.

Piccolyte S-135—a thermoplastic hydrocarbon of the Pennsylvania Industrial Chemical Co., Clairton, Pa.—melting point about 135° C.

Various coloring agents may be employed, singly or in combination, in the foregoing compositions in place of the black pigments or dyes specifically set forth in Examples I and II. Colored developer particles will generally include from .2 to 12 parts by weight of a coloring agent for each 100 parts by weight of developer particles. Suitable coloring agents include the following:

(1) Cyan Blue Toner GT (described in U.S. Patent 2,486,351 to R. H. Wiswall, Jr.)
(2) Benzidine Yellow
(3) Brilliant Oil Blue BMA, Color Index No. 6155
(4) Sudan III Red, Color Index No. 26100
(5) Oil Yellow 2G, Color Index No. 11020
(6) Hansa Yellow G, Color Index No. 11680

*Coated Particles*

Various thermoplastic developer materials which comprise coated particles may also be conveniently employed in accordance with this invention. It is preferred in such cases to incorporate in the particles a core material made up of zinc oxide. One type of zinc oxide, when fused onto a surface by means of the thermoplastic coating is incapable of retaining an electrostatic charge. [Such a zinc oxide has a value of surface photoconductivity less than $10^{-9}$ ohm$^{-2}$/square/watt/cm.$^2$ when subjected to light of a wavelength of about 3900 A.] When a fused visible image is produced with this zinc oxide it cannot be overprinted in subsequent operations.

[Another suitable type of zinc oxide comprises one having a value of surface photoconductivity of at least $10^{-9}$ ohm$^{-1}$/square/watt/cm.$^2$ when subjected to light of a wavelength of about 3900 A. These developer materials are convenient for use in color processes wherein one color is overprinted over another to provide for color mixing. When particles of too large diameter and which are insulating in character are deposited on an electrostatic image to produce a first color, such particles will prohibit over-printing thereon with another color. By providing a photoconductive zinc oxide core coated with a low-melting thermoplastic coating, developer particles are produced which, when fused to a surface, permit overprinting of a color with another and therefore provide for color mixing.

The process by which one type of coated zinc oxide particles provide for overprinting and by which another type prohibits overprinting is unique. When particles of either type are fused to a surface, the coating material melts to form a continuous layer adhering to the surface. After fusing, at least the topmost particles of zinc oxide are left protruding above the layer. When photoconductive zinc oxide particles are employed, an image surface is produced which can be charged, exposed and overprinted as easily as an original photoconductive surface. When non-photoconductive zinc oxides are employed, developed image areas are incapable of retaining a charge and, hence, cannot be overprinted in subsequent procedures.

Examples of suitable materials include the following:

EXAMPLE III

*White Developer Powder*

1 part by weight carnauba wax
2 parts by weight photoconductive zinc oxide

The wax is melted and particles of zinc oxide having a particle size from 0.25 to .5 micron mean diameter are added to the belt. Particle size and shape of the zinc oxide determine to some extent the ratio of the zinc oxide to the coating material. Continous stirring of the melt from 15 to 20 minutes is sufficient to disperse the zinc oxide in the wax when the batch weighs about 100 grams. The mixture is allowed to cool, after which it is reduced to a fine powder and classified as to particle size.

EXAMPLE IV

*Blue Developer Powder*

20 parts by weight Acrawax C (a synthetic wax-octadecenamide, of the Glyco Products Co., Brooklyn, New York)
30 parts by weight photoconductive zinc oxide
0.3 part by weight calcium stearate (pigment wetting agent)
1.5 parts by weight Cyan Blue Toner GT This composition is perpared the same, as in Example III except that the calcium stearate is added to the melt before the zinc oxide and the coloring agent after the zinc oxide.

EXAMPLE V

*Red Developer Powder*

36 parts by weight Acrawax C
5 parts by weight of a solid silicone resin (such as Dow Corning R–5071)

80 parts by weight photoconductive zinc oxide
4 parts by weight Sudan 3 Red, Color Index No. 26100
2 parts by weight Oil Yellow 2 G Color Index No. 11020
Preparation same as in Example IV.]

Pigments

It is possible to provide developer compositions which consist of organic pigments dispersed in dimethyl polysiloxane liquid. Preferably the dispersion comprises up to about 20 parts by weight of pigment the remainder being liquid. The term pigment as employed herein and in the claims is intended to include coloring agents which are sometimes referred to as dyes but which nevertheless are insoluble in the polysiloxane. When used as taught herein these so-called dyes have all the properties and attributes of pigments. Suitable pigments for such purposes include the following:

(1) Cyan Blue Toner GT (described in U.S. Patent 2,486,351 to Richard H. Wiswall, Jr.)
(2) Benzidine Yellow (Color Index No. 21090)
(3) Brilliant Oil Blue BMA—Color Index No. 61555
(4) Sudan 3 Red—Color Index No. 26100
(5) Oil Yellow 2 G—C.I. No. 11020
(6) Pyrazalone pigment. (Such as C.I. 21080 C.I. Pigment Red 39)
(7) Hansa Yellow G—C.I. 11680

In many of the foregoing dispersions it is convenient to provide a surfactant (surface active agent) to enhance the electrical properties of a selected pigment. A surfactant solution may be prepared by dispersing 10 grams of Nalcamine G–14 in 20 grams of toluene and, while mixing, heating the dispersion to dissolve the Nalcamine G–14 in the toluene. Nalcamine G–14 is a chemical of the type 1-(2-hydroxyethyl)-2-hydrogenated tallow-2-imidazoline (National Aluminate Corp., Chicago, Illinois). The Nalcamine G–14 solution is added to pigment dispersions before they are ball milled in the dimethyl polysiloxane. Such a surfactant when applied, for example, to a red pyrazalone pigment substantially enhances the electropositive nature thereof.

Reversal Type Powders

This invention also provides a developer composition which is capable of producing reverse images. By this is meant that when the composition is applied to an electrostatic image consisting of a pattern of negative electrostatic charges, the developer material will adhere in non-charged areas of the image rather than in the charged areas thereof. Such a developer composition may be prepared by dispersing a pigment in a binder material such as one which is predominantly comprised of polyvinyl chloride.

EXAMPLE VI 4 grams carbon black
30 grams dimethyl polysiloxane, viscosity about 2 centistokes The carbon black is dispersed in the polysiloxane and the dispersion ball milled in a 2 ounce glass jar with steel balls for about 40 hours. The reversal type developer composition is then made up as follows:

3 grams carbon black dispersion in polysiloxane
5 grams of "Vinylite VYNV" (a copolymer, 96% vinyl chloride and 4% vinyl acetate)
30 grams dimethyl polysiloxane This mixture is again ball milled for about 16 to 40 hours. It is preferred to dilute this dispersion with additional polysiloxane in a ratio of about 5 grams of the dispersion with up to 200 grams of additional fluid.

Color dispersions may be prepared in a like manner employing most of the pigments discussed heretofore. Some of these are set forth below along with the proportions of the constituents therein.

EXAMPLE VII

Red Reversal Powder 1 grams "Vinylite VYNV"
0 grams red pyrazalone pigment
0 grams dimethyl polysiloxane, viscosity about 2 centistokes 'his mixture is ball milled for about 32 hours and may e diluted with additional polysiloxane.

EXAMPLE VIII

Yellow Reversal Powder 4 grams "Vinylite VYNV"
grams Hansa Yellow G
0 grams dimethyl polysiloxane, viscosity about 2 centistokes 'reparation the same as for Example VII.

EXAMPLE IX

Blue Reversal Powder 2 grams "Vinylite VYNV"
:0 grams Patent Blue
0 grams dimethyl polysiloxane, viscosity about 2 centistokes 'reparation the same as in Example VII.

Us of any of the above-described developer composions in electrostatic printing processes as contemplated in ıis invention provides for new and substantially improved ɜsults. In accordance with this invention, the methods all for applying the developer composition to the elec-ostatic image by such means as, for example, flowing cross the image, spraying, application with a roller or y immersing the image in a tray containing the liquid ɔmposition. When an electrostatic image is developed ı this manner, the improved results are immediately videnced in that there is far less deposition of developer articles in unwanted areas of the image than was hitherto eemed possible. By the simple step of heating the surface n which the developed image resides to a temperature bove the melting point of the developer particles, excess arrier liquid is driven rfom the surface and the developer articles are fused thereto. By this method a durable nage is formed which can withstand repeated handlings 'ithout smearing and which when applied to a flexible ırface will flex with that surface rather than to peel r chip therefrom. During the heating step another nusual property of the dimethyl polysiloxane manifests self. Although it may have a flash point of only about 75° F. it can, without danger of fire, be heated to a ɜmperature of 425° F. or even more.

What is claimed is:

1. A composition of matter comprising a dispersion of lectroscopic particles having a diameter not larger than bout 7E4 microns in a liquid consisting essentially of a imethyl polysiloxane having a viscosity of between about .6 and about 3 centistokes, said particles being substanally insoluble in said liquid, the concentration of said articles in said composition being no greater than about 0% by weight.

2. The composition of claim 1 wherein the concentraon of said particles in said composition is no greater than bout 6% by weight.

3. A composition of matter comprising a dispersion of lectroscopic particles having a diameter not in excess of ɔout 74 microns, said particles comprising a material ɜlected from the class consisting of natural and synthetic 'axes and resins, in a liquid consisting essentially of a imethyl polysiloxane having a viscosity between about .6 and about 3 centistokes, the concentration of said articles in said composition being no greater than about 0% by weight.

4. The composition of claim 3 wherein the concentration of said particles in said composition is no greater than about 6% by weight.

5. The composition of claim 4 wherein said particles comprise a thermoplastic material having a melting point less than about 200° C.

6. The composition of claim 5 wherein said thermoplastic material is substantially colorless and has coloring matter incorporated therein.

7. A composition of matter comprising a dispersion of particles of zinc oxide coated with an electroscopic material selected from the class consisting of natural and synthetic waxes and resins having a melting point of from about 90° C. to about 200° C., in a liquid consisting essentially of a dimethyl polysiloxane having a viscosity of about 0.6 to about 3 centistokes, the concentration of said particles in said composition being no greater than about 20% by weight.

8. The composition of claim 7 wherein the concentration of said coated particles in said composition is no greater than about 6% by weight.

9. The composition of claim 8 wherein said electroscopic material is substantially colorless and has coloring matter incorporated therein.

[10. A composition of matter comprising a dispersion in a liquid of particles of photoconductive zinc oxide having a diameter not larger than about 74 microns, said particles having a coating thereon of a thermoplastic electroscopic material having a melting point within a range of from about 90° C. to about 200° C., said liquid consisting essentially of a dimethyl polysiloxane having a viscosity of from about 0.6 to about 3 centistokes, said thermoplastic material being substantially insoluble in said liquid, the concentration of said particles in said composition being no greater than about 20% by weight.]

[11. The composition of claim 10 wherein the concentration of said particles in said composition is no greater than about 6% by weight.]

[12. The composition of claim 10 wherein said electroscopic material is selected from the class consisting of substantially colorless natural and synthetic waxes and resins and has coloring matter included therein.]

13. A composition of matter comprising a dispersion in a liquid of colored electroscopic particles having a diameter not larger than about 74 microns, said particles comprising a pigmented resinous material the major proportion of which is polyvinyl chloride, said liquid consisting essentially of a dimethyl polysiloxane having a viscosity of from about 0.6 to 3 centistokes, the concentration of said particles in said composition being no greater than about 20% by weight.

14. The composition of claim 13 wherein the concentration of said particles in said composition is no greater than about 6% by weight.

15. The composition of claim 13 wherein said resinous material comprises at least 90% by weight of polyvinyl chloride.

16. The composition of claim 13 wherein said resinous material is a copolymer consisting essentially of about 96% by weight of vinyl chloride and 4% by weight of vinyl acetate.

17. In a method of developing an electrostatic image on an insulating surface, the improvement comprising applying to said surface a developer composition consisting essentially of finely-divided electroscopic thermoplastic particles dispersed as a phase in a carrier liquid consisting essentially of a dimethyl polysiloxane having a viscosity of between about 0.6 and 3 centistokes, depositing said thermoplastic particles on said surface by electrostatic attraction thereto, and heating said surface to fuse said particles thereto and remove said dimethyl polysiloxane therefrom.

18. In a method of developing an electrostatic image on an insulating surface, said image comprising a pattern of negative electrostatic charges, the improvement comprising; applying to said surface a developer composition consisting essentially of pigmented thermoplastic developer particles dispersed as a phase in a dimethyl polysiloxane liquid having a viscosity of between about 0.6 and 3 centistokes; depositing said developer particles on said pattern of negative electrostatic charges; and, heating said surface to fuse said developer particles thereto and to remove said dimethyl polysiloxane therefrom.

19. In a method of developing an electrostatic image on an insulating surface, said image including areas bearing negative electrostatic charges, the improvement comprising: applying to said surface a developer composition comprising pigmented developer particles, the major proportion of which is polyvinyl chloride, dispersed as a phase in a dimethyl polysiloxane liquid having a viscosity of about from 0.6 to 3 centistokes; depositing said developer particles in areas on said surface other than said areas bearing negative electrostatic charges; and, heating said surface to fuse said developer particles thereto and to remove said dimethyl polysiloxane therefrom.

*20. An improved controlled but unfixed liquid developer for a xerogaphic image consisting essentially of, pigment particles in finely divided particulate form, an organic dielectric material capable of forming a resinous coating on the pigment particles, coating said pigment particles and adapted for insuring that the particles have a charge of substantially uniform polarity and magnitude, and a carrier liquid for said pigment particles in which sad material is insoluble whereby said particles are moved and deposited under influence of the charge of the material when suspended in said insulating liquid but are not fixed to the image after evaporation of the carrier liquid.*

*21. A developer according to claim 20, in which said*

*organic dielectric material is a thermoplastic material selected from the class consisting of natural and synthetic waxes and resins.*

References Cited

The following references, cited by the Examiner, are of record in the patented file of this patent or the original patent.

UNITED STATES PATENTS

| | | | |
|---|---|---|---|
| 2,735,784 | 2/1956 | Greig et al. | 252—62.1 X |
| 2,784,109 | 3/1957 | Walkup | 252—62.1 X |
| 2,297,691 | 10/1942 | Carlson | 117—17.5 X |
| 2,877,133 | 3/1959 | Mayer | 117—37 LE |
| 2,890,174 | 6/1959 | Mayer | 252—62.1 |
| 2,892,709 | 6/1959 | Mayer | 117—17.5 X |
| 2,899,335 | 8/1959 | Straughan | 117—37 LE |
| 3,058,914 | 10/1962 | Metcalfe et al. | 252—62.1 |

FOREIGN PATENTS

| | | | |
|---|---|---|---|
| 1,112,180 | 11/1955 | France | 117—17.5 |
| 755,486 | 8/1956 | Great Britain | 117—17.5 |

OTHER REFERENCES

Dow Corning Silicone Notebook, Fluid Series No. 3, September 1948, pp. 3, 11, 18 and 19.

RICHARD D. LOVERING, Primary Examiner

U.S. Cl. X.R.

96—1.8; 117—93, 100 A, 100 B; 252—62.1; 260—29.1 R, 29.1 S, 41 B, 41 C, 41 R